United States Patent [19]
Ikeshima et al.

[11] Patent Number: 5,855,445
[45] Date of Patent: Jan. 5, 1999

[54] BONDING CONSTRUCTION OF ROTARY MEMBERS

[75] Inventors: Masahiro Ikeshima; Akira Iijima; Takashi Nakazawa, all of Tokyo, Japan

[73] Assignee: Niles Parts Co.,Ltd., Japan

[21] Appl. No.: 845,463

[22] Filed: Apr. 25, 1997

[30] Foreign Application Priority Data

May 13, 1996 [JP] Japan .................................. 8-141119

[51] Int. Cl.$^6$ ...................................................... B25G 3/00
[52] U.S. Cl. ................................ 403/14; 403/13; 403/375
[58] Field of Search .............................. 403/13, 14, 375, 403/383, 359; 200/61.88

[56] References Cited

U.S. PATENT DOCUMENTS

| | | | |
|---|---|---|---|
| 390,615 | 10/1888 | Nye | 403/359 X |
| 3,290,918 | 12/1966 | Weasler | 403/359 X |
| 4,115,022 | 9/1978 | Orain | 403/359 |
| 4,950,101 | 8/1990 | Artzberger | 403/359 X |
| 5,525,768 | 6/1996 | Cobb, III et al. | 200/61.88 |
| 5,693,925 | 12/1997 | Yamada et al. | 200/61.88 |

FOREIGN PATENT DOCUMENTS 7-94051  4/1995  Japan .

*Primary Examiner*—Kenneth J. Dorner
*Assistant Examiner*—William L. Miller
*Attorney, Agent, or Firm*—Rader, Fishman & Grauer; Ronald P. Kananen

[57] ABSTRACT

A bonding construction for bonding a rotary shaft made of a resin material to a lever made of a resin material. The lever is formed with a fitting hole therein into which the rotary shaft is fitted. The rotary shaft has projections formed on its outer surface. The inner surface of the fitting hole of the lever is formed with grooves into which the projections of the rotary shaft are fitted. The rotary shaft and the lever are melted together at their interface between the projections and the grooves by ultrasonic welding.

7 Claims, 4 Drawing Sheets

BONDING CONSTRUCTION OF ROTARY MEMBERS

BACKGROUND OF THE INVENTION

1. Field of the Invention

The present invention relates to a bonding construction in which a rotary shaft made of a resin material is bonded to a lever for transmitting a torque to the rotary shaft.

2. Description of the Related Art

A conventional bonding construction for rotary members is disclosed, for example, in Japanese Patent Publication (Kokai) No. 794051, for an inhibitor switch that detects the "shift-position" in a transmission of an automobile. In the conventional construction, a rotary shaft is journaled in a housing, and an operating lever is coupled to the end portion of the rotary shaft. The shaft and lever are made of a synthetic resin material. The shaft and lever are bonded together by heat-fusion or ultrasonic welding.

However, with the conventional bonding construction, the rotary shaft and operating lever are bonded merely by heat fusion or ultrasonic welding. Thus, the bonded portion through which a large torque is transmitted may break and fail to perform its intended function if a sufficient adhesion is not provided. Providing a fusion area large enough for withstanding a large torque necessitates a large diameter of the rotary shaft, resulting in a large overall size of the construction. This is a disadvantage.

SUMMARY OF THE INVENTION

It is an object of the present invention to provide a construction for bonding rotary members that solves the problems associated with the conventional bonding construction described above.

More specifically, it is an object of the present invention to provide a bonding construction for rotary members which provides sufficient fusion strength without necessitating a large construction.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, a bonding construction of rotary members is provided, comprising: a rotary shaft made of a resin material, and a lever made of a resin material and having a fitting hole formed therein into which the rotary shaft is fitted. The rotary shaft has projections formed on its outer surface and extending axially. The fitting hole in the lever has grooves into which the projections are fitted. The rotary shaft and lever are melted together at their interface between the projections and the grooves by ultrasonic welding.

An even number of projections are preferably formed on the rotary shaft, and an even number of grooves are preferably formed in the inner surface of the fitting hole in the lever. The projections are diametrically opposite with respect to the longitudinal axis of the rotary shaft. The grooves are diametrically opposite with respect to the axis of the fitting hole.

A plurality of projections are preferably formed on the outer surface of the rotary shaft, and a plurality of grooves are preferably formed in the inner surface of the fitting hole in the lever. At least one of the projections differs in shape from the other projections, and at least one of the grooves differs in shape from the other grooves.

At least one of the projections preferably includes a narrow-width portion extending to the free end of the projection, a wide-width portion at a base of the projection, and a tapered portion continuous with and between the narrow-width portion and the wide-width portion. A corresponding one of the grooves preferably has an opening larger than the width of the narrow-width portion of the corresponding projection.

At least one of the grooves preferably includes a narrow groove portion having a width smaller than that of the narrow-width portion of the corresponding projection, a wide groove portion having substantially the same width as the wide-width portion of the corresponding projection, and a positioning step portion formed between the narrow groove portion and wide groove portion and having substantially the same dimension as the narrow-width portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention. In the drawings.

DETAILED DESCRIPTION OF THE INVENTION

A preferred embodiment of a bonding construction according to the present invention will be described by reference to an inhibitor switch shown in FIGS. 1 to 7 of the drawings.

Figure 1:
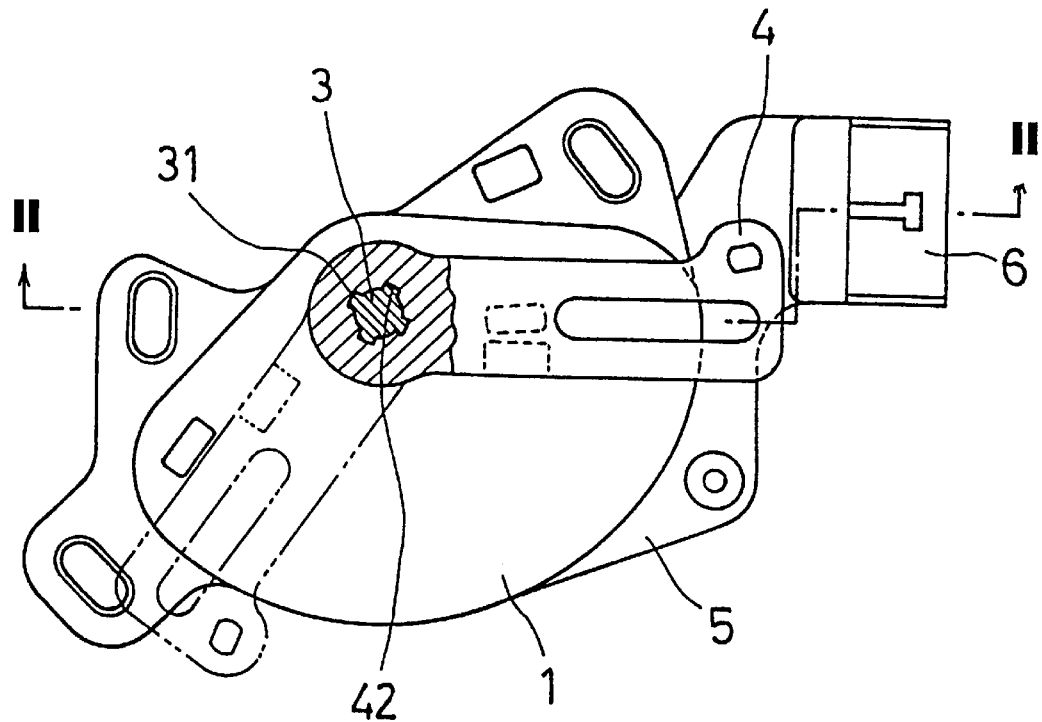
FIG. 1 is a partially cross-sectional view of an inhibitor switch having a bonding construction according to a preferred embodiment of the present invention.
Figure 2:
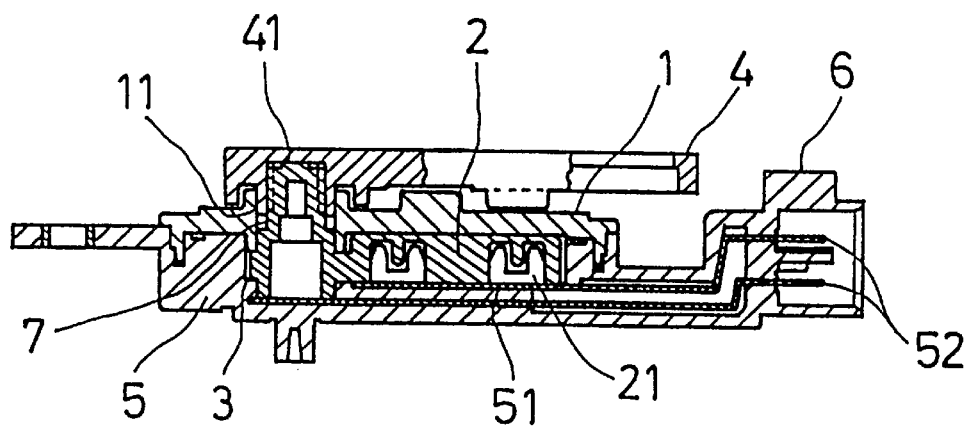
FIG. 2 is a cross-sectional view taken along the line II—II of the inhibitor switch shown in FIG. 1.

As shown in FIGS. 1 and 2, a case 1 of the inhibitor switch is made of a synthetic resin material and is formed with a bearing hole 11 in which a rotary shaft 3 is journaled. A movable plate 2 made of a synthetic resin material is in a one piece construction with the rotary shaft 3 and has movable contacts 21 at its bottom. An operating lever 4 made of a synthetic resin material rotates in accordance with the operation of an automatic transmission (not shown).

The operating lever 4 and rotary shaft 3 are melted together by ultrasonic welding so that the operating lever 4 is securely bonded to the movable plate 2 and operatively drives the movable plate 2 when the operating lever 4 is pivoted about the axis of the rotary shaft 3. The operating lever 4 is pivotally rotatable over the outer surface of the case 1, while the movable plate 2 is pivotally rotatable within the case 1.

A substrate 5 has fixed contacts 51 insert molded therein, which contacts 51 are brought into contact with the movable contacts 21 when the movable plate 2 rotates. The substrate 5 is in a one piece construction with a connector 6. The connector 6 has terminals 52 therein which are electrically connected with the fixed contacts 51. The substrate 5 is bonded by ultrasonic welding to the case 1 to define a closed space between the substrate 5 and the case 1 so that the movable plate 2 is housed in the closed space. An O-ring 7 is mounted to the rotary shaft 3 so as to seal between the rotary shaft 3 and the bearing hole 11.

The construction of the lever 4 and movable plate 2 will now be described in more detail. As shown in FIGS. 3 to 5 and 7, the rotary shaft 3 is formed with four projections 31 extending axially of the rotary shaft 3. The projections 31 are angularly equally spaced with respect to the rotational axis of the rotary shaft 3. Each of the projections 31 has a narrow-width portion 32 which has a width W1 and extends from the free end of the rotary shaft 3 over a length L1, and a wide-width portion 33 which has a width W2 at its base portion, the width W2 being wider than the width W1 (i.e., W2>W1). The narrow-width portion 32 is continuous with the wide-width portion 33 via a tapered portion 34.

One 31' of the four projections 31 has a narrow-width portion having a width W1' and a wide-width portion having a width W2', the widths W1' and W2' being somewhat smaller than those widths W1 and W2 of the three remaining projections 31 (i.e., W1'<W1'and W2'<W2). Each of the projections 31 has a chamfered portion 35 which forms a guide surface for facilitating the insertion of the rotary shaft 3 into a fitting hole 41 of the operating lever 4.

Figure 3:
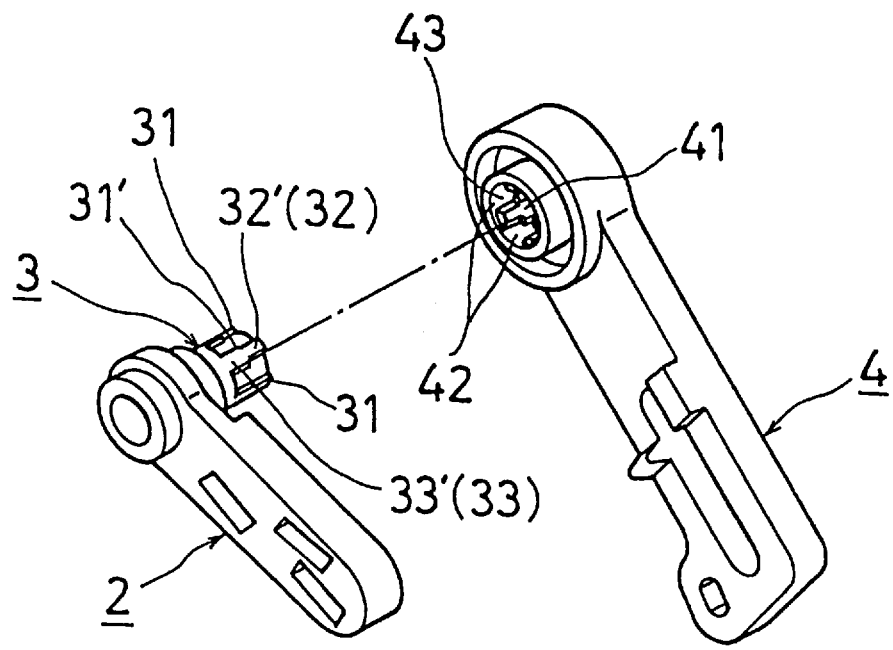
FIG. 3 is a perspective view of a relevant portion of the inhibitor switch.
Figure 4:
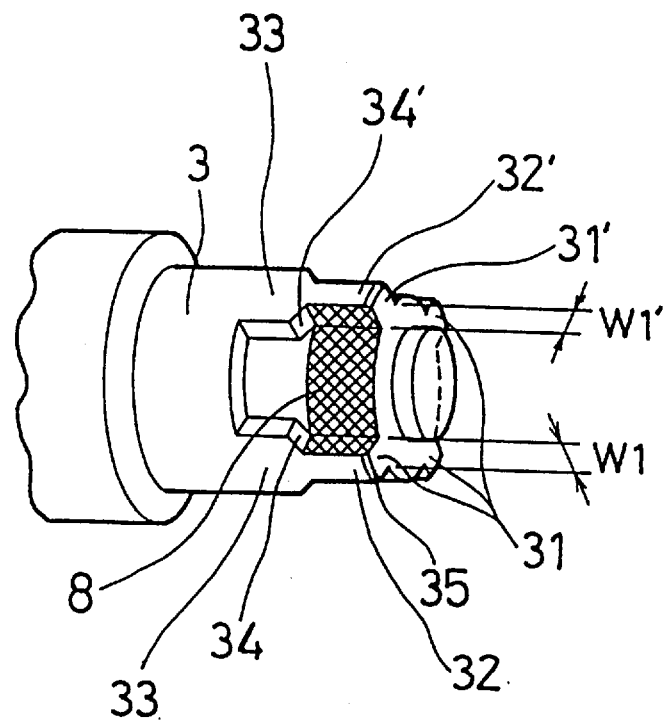
FIG. 4 is a perspective view of another relevant portion of the inhibitor switch.
Figure 5:
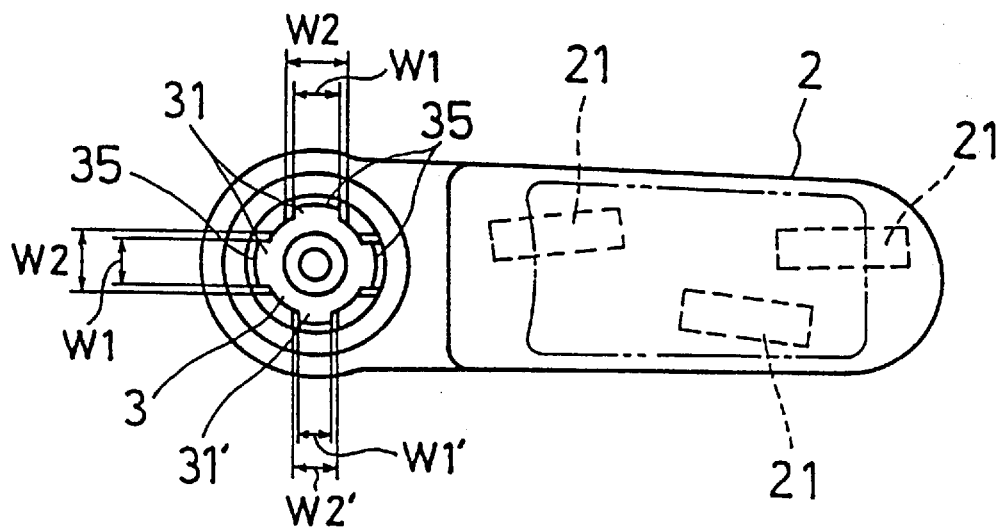
FIG. 5 is a plan view, showing a rotary shaft and a movable plate of the inhibitor switch.
Figure 6:
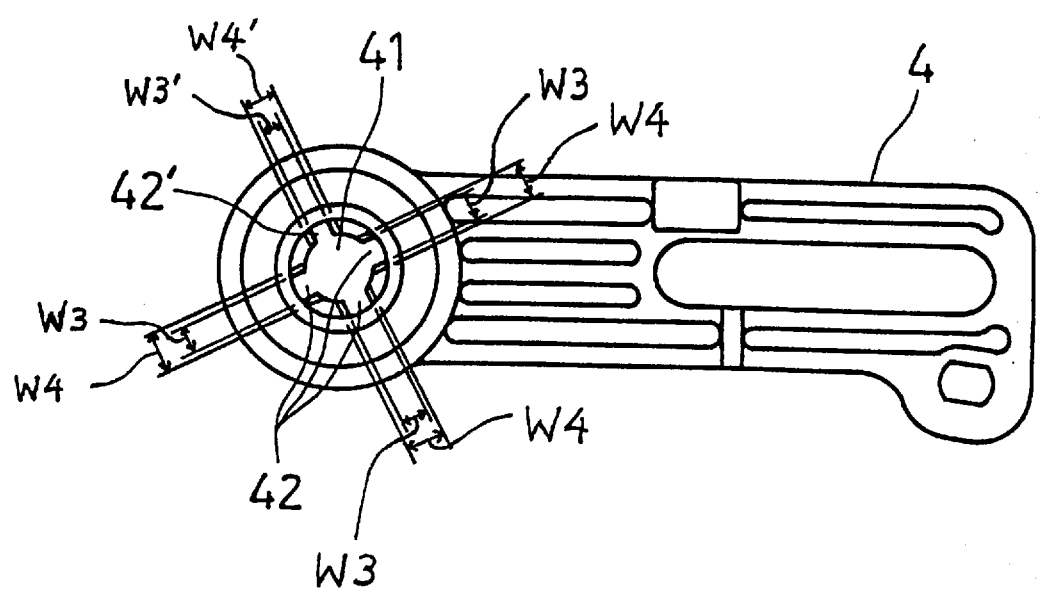
FIG. 6 is a plan view, showing an operating lever of the inhibitor switch.
Figure 7:
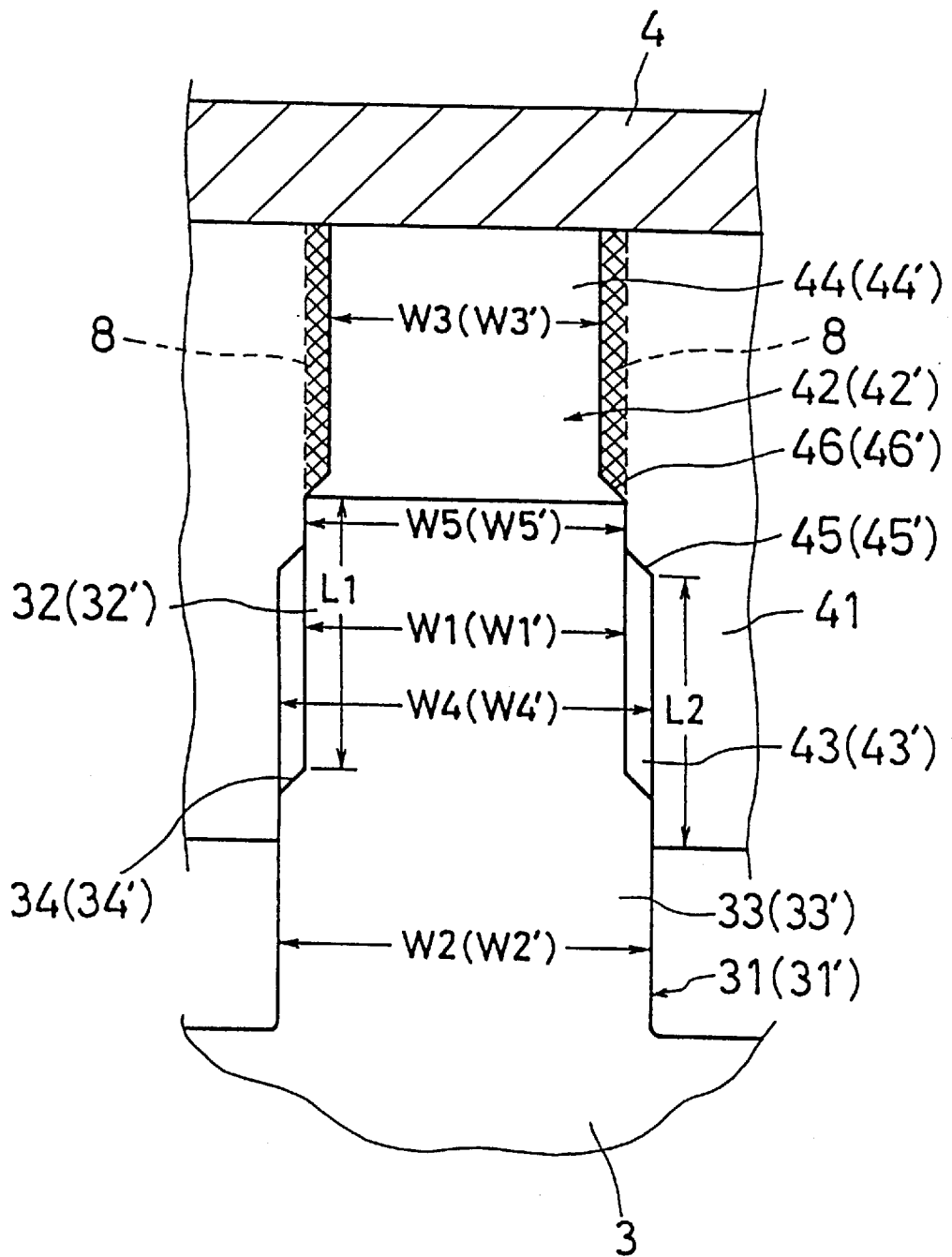
FIG. 7 is an enlarged view of a single projection and groove which illustrates the relationship between the projections and grooves of the inhibitor switch.

As shown in FIGS. 3, 6, and 7, the operating lever 4 is formed with the fitting hole 41 into which the end portion of the rotary shaft 3 is inserted. There are formed four grooves 42 and 42' in the inner surface of the fitting hole 41, the four grooves opposing and receiving the four projections 31 and 31' therein when the shaft 3 is inserted into the fitting hole 41. The grooves 42 and 42' in the fitting hole 41 have wide grooves 43 and 43' near the opening end of the fitting hole 41, narrow grooves 44 and 44' beyond the wide grooves, and tapered grooves 45 and 45' between the wide grooves and narrow grooves, all of which being of a shape complementary to corresponding portions of the projections 31 and 31'. The three wide grooves 43 have a width W4 which is equal to or somewhat larger than the width W2 of the wide-width portion 33 of the projection 31 formed on the rotary shaft 3 (i.e., W4≧W2). The three narrow grooves 44 have a width W3 which is somewhat smaller than the width W1 of the narrow-width portion 32 formed on the projection 31 (i.e., W3<W1).

One remaining groove 42' has a wide groove 43' having a width W4' and a narrow groove 44' having a width W3'. The widths W4' and W3' have the following relations:

W4'≧W2' and W3'<W1' where the width W4' of the wide groove 43' corresponds to the width W2' of the wide-width portion 33' of the projection 31' and the width W3' of the narrow groove 44' corresponds to the width W1' of the narrow-width portion of the projection 31'.

The width W4' of the wide groove 43' is smaller than the width W1 of the three other narrow width portions 32 of the projections 31 (i.e., W4'<W1) so that only one remaining narrow width portion 32' can be inserted into the corresponding wide groove 43'. This construction ensures proper orientation of the rotary shaft 3 with respect to the operating lever 4 before they are assembled to each other, thereby preventing insertion of the rotary shaft 3 into the operating lever 4 in a wrong direction.

The tapered portions 45 and 45' are formed with positioning steps 46 and 46' thereon, and the widths W5 and W5' of the positioning steps 46 and 46' are equal to or slightly larger than the widths W1 and W1' of the narrow width portions 32 and 32' formed on the projections 31 and 31', respectively (i.e., W5≧W1 and W5'≧W1'). To summarize, there are the following relations:

W3<W1≦W5<W2≦W4;
W3'<W1'≦W5'<W2'≦W4'; and
W4'<W1.

The length L1 of the narrow width portions 32 and 32' of the projections 31 and 31' formed on the rotary shaft 3 is equal to or somewhat shorter than the length L2 of the wide grooves 43 and 43' (i.e., L1≦L2), so that when the end portion of the rotary shaft 3 is inserted into the fitting hole 41 of the operating lever 4 until the projections 31 and 31' are fitted into the grooves 42 and 42', the end portions of the narrow width portions 32 and 32' are supported by the steps 46 and 46' while the end portions of the wide width portions 33 and 33' are received by the openings of the wide grooves 43 and 43', thereby the rotary shaft 3 is properly held in position in the fitting hole 41 of the operating lever 4.

When bonding the rotary shaft 3 and the operating lever 4 together by ultrasonic welding, the rotary shaft 3 is first inserted into the bearing hole 11 to extend through the case 1. Then, the end portion of the rotary shaft 3 projecting outwardly of the outer wall surface of the case 1 is inserted into the fitting hole 41 in the operating lever 4 in such a way that the projections 31 fit into the grooves 42.

The projections 31 can be accurately positioned relative to the grooves 42 since the narrow width portion 32 of three of the projections 31 has the width W1 larger than the width W4' of the one remaining wide groove 43' (i.e., W1>W4'). The narrow width portions 32 and 32' serve as a guide when the projection 31 is inserted into the fitting hole 41 since the widths W1 and W1' of the narrow width portions 32 and 32' are smaller than the widths W4 and W4' of the wide grooves 43 and 43' (i.e., W1<W4 and W1'<W4').

As previously mentioned, the narrow width portions 32 and 32' of the projections 31 and 31' are received at their end portions by the steps 46 and 46' of the grooves 42 and 42', respectively. Likewise, the wide width portions 33 and 33' are received at their end portions by the openings of the wide grooves 43 and 43' of the grooves 42 and 42', respectively. Thus, the rotary shaft 3 is held in position with respect to the fitting hole 41 in the operating lever 4. Thereafter, the movable plate 2 of the rotary shaft 3 is placed on the ultrasonic welding machine (not shown), and an ultrasonic welding head is pressed against the assembly from the operating lever side so as to apply ultrasonic waves thereto. The rotary shaft 3 is gradually pushed into the fitting hole 41 so that the narrow width portions 32 and 32' of the projections 31 and 31' advance into the narrow grooves 44 and 44'. Thus, the rotary shaft 3 and the operating lever 4 are melted together over a wide area depicted by hatching 8 in FIGS. 4 and 7.

In the aforementioned embodiment, the four projections 31 and 31' and four grooves 42 and 42' are angularly equally spaced with respect to the axis of the rotary shaft 3, respectively. This arrangement is advantageous in that when a mold for the projections 31 and 31' is designed, the projections and grooves can be machined by moving a cutter only in a two dimensional plane, i.e., the X-direction and Y-direction. This ensures accurate machining operation without difficulty. When an even number of pairs of projections and grooves in excess of four are provided at diametrically opposite locations, projections 31 and 31' and corresponding grooves 42 and 42' can be machined at the same coordinate positions. Thus, the cutter is moved less often than when an odd number of pairs of projections and grooves are provided. This facilitates an accurate machining operation.

In the aforementioned embodiment, the projection 31' is arranged so that the projection 31' diametrically opposes one of the other projections 31 with respect to the rotational axis of the movable plate 2. This arrangement reduces movement of the cutter during the manufacture of a mold, thereby increasing machining accuracy.

According to a first aspect of the present invention, a rotary shaft and a lever are made of a resin material. The rotary shaft has projections formed on its outer surface which extend along the rotary shaft. The lever has a fitting hole formed therein into which the rotary shaft fits. The fitting hole has grooves into which the projections are fitted. The rotary shaft and lever are melted together at their interface between the projections and the grooves by ultrasonic welding. This construction ensures a sufficient area in which the rotary shaft and lever are melted together, thereby increasing the welded strength. The rotary shaft engages the lever through a projection-to-recess fitting engagement. This engagement ensures transmission of a torque from the lever to the shaft even if they are poorly melted together.

According to another aspect of the present invention, an even number of the projections are formed on the rotary shaft, and an even number of the grooves are formed in the inner surface of the fitting hole in the lever, the projections being diametrically opposite with respect to the axis of the rotary shaft and the grooves being diametrically opposite with respect to the axis of the rotary shaft. This construction allows machining of the opposing parts of a mold which correspond to the projections or grooves without changing the position of the cutter when machining the mold. This makes the machining operation easier and increases the machining accuracy. This construction is particularly effective in manufacturing an apparatus such as an inhibitor switch which requires accurate angular positioning.

According to another aspect of the present invention, a plurality of the projections are formed on the outer surface of the rotary shaft and a plurality of the grooves are formed in the inner surface of the fitting hole in the lever. At least one of the projections differs in shape from the other projections and at least one of the grooves differs in shape from the other grooves. This construction ensures the simple positioning of the rotary shaft and the lever with respect to each other and prevents misassembly of the rotary shaft and the lever.

According to another aspect of the present invention, the projection includes a narrow-width portion extending to a free end of the projection, a wide-width portion at the base, and a tapered portion continuous with and between the narrow-width portion and the wide-width portion. The groove has an opening larger than the width of the narrow-width portion of the projection. The narrow-width portion and tapered portion of the projection serve to guide the rotary shaft into the groove, thereby improving assembly efficiency when inserting the rotary shaft into the fitting hole in the lever.

According to yet another aspect of the present invention, the groove includes a narrow groove portion having a width smaller than the narrow-width portion formed at the end portion of the projection, a wide groove portion having substantially the same width as the wide-width portion of the projection, and a positioning step formed between the narrow groove and wide groove portions. This construction allows the position and orientation of the rotary shaft with respect to the lever at two locations, i.e., the end portion of the narrow-width portion and the wide-width portion of the projection, while at the same time the rotary shaft is fitted into the middle of the fitting hole in the lever. Thereafter, the ultrasonic welding may be performed, allowing accurate bonding of the rotary shaft and the lever.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bonding construction of rotary members, comprising:
a rotary shaft (3) made of a resin material, the rotary shaft having a plurality of projections (31) formed on an outer surface thereof, the projections extending substantially parallel to and diametrically opposite to a longitudinal axis of the rotary shaft;
wherein the projections each include a narrow-width portion (32, 32') extending to a free end of the projection, a wide-width portion (33, 33') at a base of the projection, and a tapered portion continuous with and between the narrow-width portion and the wide-width portion;
wherein at least one (31') of the projections (31, 31') having a shape that differs from the other projections (31, 31');
a lever (4) made of a resin material and having a portion defining a fitting hole (41) into which the rotary shaft is fitted, the portion having a plurality of grooves (42) formed in an inner surface of the fitting hole (41) into which the projections are fitted, wherein the grooves are formed so as to be diametrically opposite with respect to the longitudinal axis of the rotary shaft when the projections are fitted within the fitting hole;
wherein the grooves each further include an opening larger than the width of the narrow-width portion of a corresponding one of the projections;
wherein at least one (42') of the grooves (42, 42') having a shape that differs from the other grooves (42, 42'); and
wherein the rotary shaft (3) and lever (4) are melted together at an interface between the projection and the groove by ultrasonic welding.

2. The bonding construction according to claim 1, wherein each of the grooves includes a narrow groove portion having a width smaller than the narrow-width portion of a corresponding one of the projections, a wide groove portion having a substantially same width as the wide-width portion of a corresponding one of the projections, and a positioning step portion formed between the narrow groove portion and the wide groove portion and having a substantially same dimension as the tapered portion of a corresponding one of the projections.

3. The bonding construction according to claim 1, wherein there are provided an even number of the projections formed on the rotary shaft and an even number of the grooves formed in the inner surface of the fitting hole of the lever, the projections being diametrically opposite with respect to the longitudinal axis of the rotary shaft and the grooves being diametrically opposite with respect to the longitudinal axis of the rotary shaft.

4. A bonding construction of rotary members, comprising:

a rotary shaft (3) made of a resin material, the rotary shaft having a plurality of projections (31) formed on an outer surface thereof, the projections extending substantially parallel to and diametrically opposite to a longitudinal axis of the rotary shaft;

wherein the projections each include a narrow-width portion (32, 32') extending to a free end of the projection, a wide-width portion (33, 33') at a base of the projection, and a tapered portion continuous with and between the narrow-width portion and the wide-width portion;

a lever (4) made of a resin material and having a portion defining a fitting hole (41) into which the rotary shaft is fitted, the portion having a plurality of grooves (42) formed in an inner surface of the fitting hole (41) into which the projections are fitted, wherein the grooves are formed so as to be diametrically opposite with respect to the longitudinal axis of the rotary shaft when the projections are fitted within the fitting hole;

wherein the grooves (42, 42') of the fitting hole (41) each include a narrow groove portion having a width smaller than the narrow-width portion of a corresponding one of the projections, a wide groove portion having a substantially same width as the wide-width portion of a corresponding one of the projections, and a positioning step portion formed between the narrow groove portion and the wide groove portion and having a substantially same dimension as the tapered portion of a corresponding one of the projections; and wherein the rotary shaft (3) and lever (4) are melted together at an interface between the projection and the groove by ultrasonic welding.

5. A bonding construction of rotary members, comprising:

a rotary shaft (3) made of a resin material, the rotary shaft having at least one projection (31) formed on an outer surface thereof, the projection extending substantially parallel to longitudinal axis of the rotary shaft;

wherein the projection includes a narrow-width portion (32, 32') extending to a free end of the projection, a wide-width portion (33, 33') at a base of the projection, and a tapered portion continuous with and between the narrow-width portion and the wide-width portion;

a lever (4) made of a resin material and having a portion defining a fitting hole (41) into which the rotary shaft is fitted, the portion having at least one groove (42) formed in an inner surface of the fitting hole (41) into which the projection is fitted;

wherein the groove (42, 42') of the fitting hole (41) includes a narrow groove portion having a width smaller than the narrow-width portion of the projection, a wide groove portion having a substantially same width as the wide-width portion of the projection, and a positioning step portion formed between the narrow groove portion and the wide groove portion and having a substantially same dimension as the tapered portion of the projection; and wherein the rotary shaft (3) and lever (4) are melted together at an interface between the projection and the groove by ultrasonic welding.

6. A construction for bonding together rotary members, comprising:

a rotary shaft (3) made of resin material, the rotary shaft having an even number of projections (31) formed on an outer surface thereof, the projections extending substantially parallel to and diametrically opposite to a longitudinal axis of the rotary shaft, a narrow-width portion of said projections having a first width (W1, W1');

wherein at least one (31') of the projections (31, 31') have a shape that differs from the other projections (31, 31');

a lever (4) made of a resin material and having a fitting hole (41) into which the rotary shaft is fitted, said fitting hole having an even number of grooves (42) into which the projections are fitted, wherein said grooves are formed so as to be diametrically opposite to the longitudinal axis of the rotary shaft when the projections are fitted, said grooves having a narrow groove portion having a second width (W3, W3') which is less than said first width (W1, W1');

wherein at least one (42') of the grooves (42, 42') differs in shape from the other grooves; and said rotary shaft (3) and said lever (4) being melted together at an interface between the narrow-width portion of said projection and the narrow groove portion of said groove by ultrasonic welding.

7. The construction according to claim 6, wherein said projection further comprises a wide-width portion and said groove further comprises a wide groove portion, said wide-width portion of said projection being fitted into said wide groove portion of said groove, a width (W2, W2') of said wide-width portion of said projection being equal to or less than a width (W4, W4') of said wide groove portion so that no ultrasonic welding occurs between said wide-width portion and said wide groove portion.

* * * * *